Sept. 17, 1968  L. G. KILMER ET AL  3,401,770

GAS EXPLODER APPARATUS FOR PROPAGATING SEISMIC WAVES

Filed Feb. 6, 1967

INVENTORS.
LAUREN G. KILMER
PHIL W. WISE

BY McLean, Morton & Boustead
ATTORNEYS.

United States Patent Office 3,401,770
Patented Sept. 17, 1968

3,401,770
GAS EXPLODER APPARATUS FOR PROPAGATING SEISMIC WAVES
Lauren G. Kilmer and Phil W. Wise, Tulsa, Okla., assignors to Sinclair Research, Inc., New York, N.Y., a corporation of Delaware
Filed Feb. 6, 1967, Ser. No. 614,289
8 Claims. (Cl. 181—.5)

ABSTRACT OF THE DISCLOSURE

A seismic prospecting device comprising a gas exploder adapted for underwater use including an expansible explosion chamber having a rigid top and a rigid bottom connected together by an extensible sidewall and resilient fastening means including air cushion spring means arranged above the chamber for attaching the top and bottom together and for normally biasing the top and bottom together, resilient sealing means inside of the joint formed between the top and bottom, gas charging and ignition means for the chamber, exhaust means for the chamber, and bubble cap means above the air cushion spring means to protect it against cavitation.

---

Figures 1, 2:
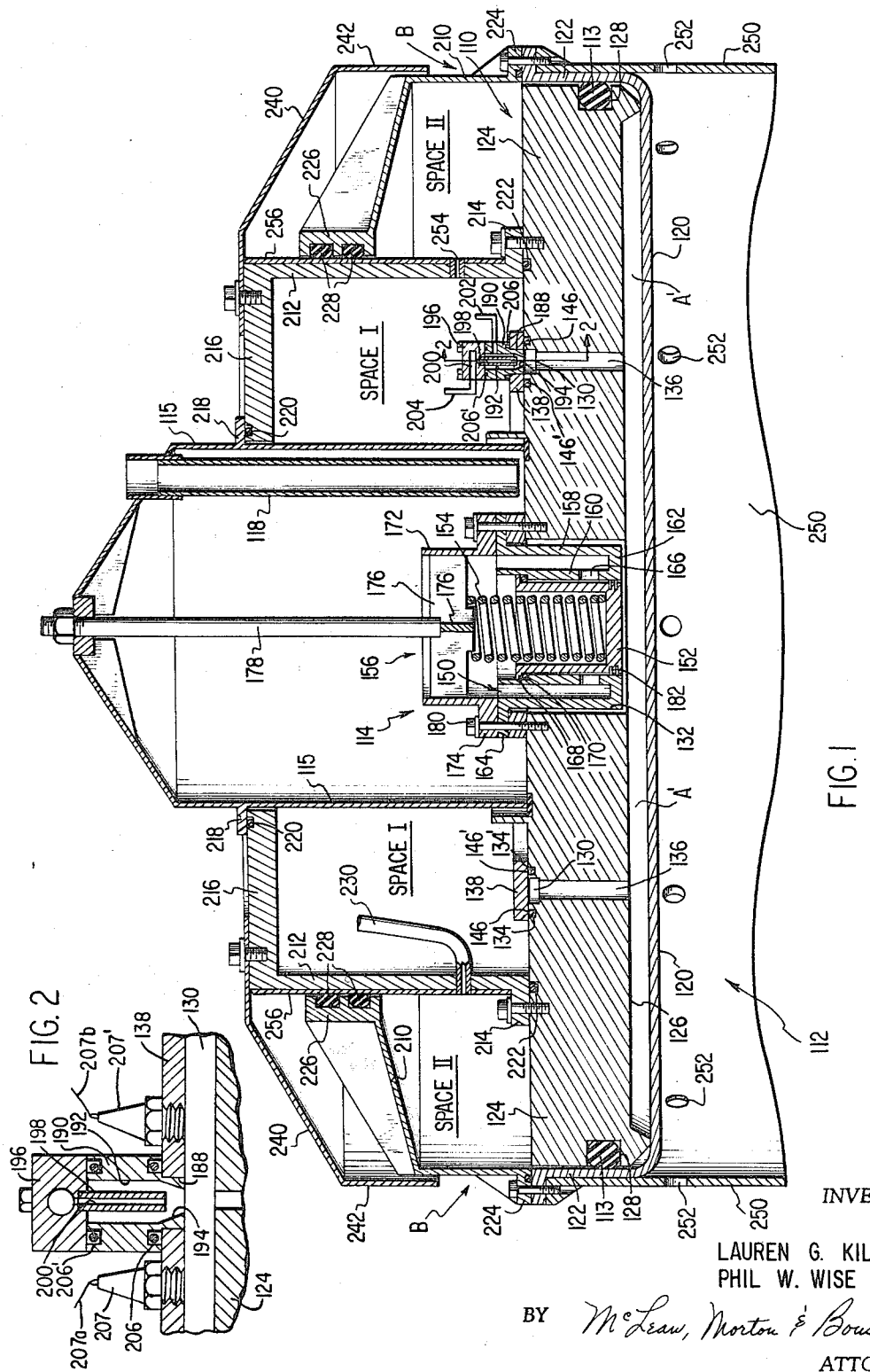

As water-covered areas of the earth have been explored for oil bearing formations, efforts have been made to apply the dry land techniques of seismic surveying and while satisfactory results have been obtained, much has been left to be desired in reducing the cost of an operation which is highly expensive even under favorable conditions. For instance, it is known that a gas explosion confined in an expansible chamber acting at the earth-air interface against a large mass positioned above such gas explosion, can be used to impart a compression wave to the surface of the earth beneath the gas explosion, thereby initiating a seismic wave, see copending application Ser. No. 314,230 to Lauren G. Kilmer, filed Oct. 7, 1963. If the explosion is confined in a device having a rigid top (carrying the weight of the large mass) and rigid bottom with vertical extensible sidewalls, the seismic wave generated is useful for seismic prospecting by refraction and reflection techniques, since the pulse imparted to the earth's surface has a high energy content and can be made of extremely short duration. The size and weight of such devices, the necessary gas feed lines and exhaust system, however have heretofore limited their utility in exploring water-covered areas of the earth. Also, the lack of a solid base upon which the device can rest has presented problems. Although it has been attempted to use such devices by supporting them on the bottom of barges or boats, this has generally been unsuccessful due to the large force of the seismic wave produced which adversely affects the boat structure. For these reasons, it has been the usual practice in underwater geophysical exploration to relay upon the well known techniques of generating seismic waves by exploding a quantity of explosive material such, for example, as dynamite and nitro carbo nitrate, contained within a cartridge or casing and fired beneath the water in predetermined spaced relation with respect to the seismic spread.

The use of explosive material, however, possesses several disadvantages, one of which, obviously, is the necessity for replacement of the explosive cartridge after each firing and the problems incident to establishing a firing circuit to each of the cartridges in successive order whenever another cartridge is to be fired. Such an arrangement is costly in operation particularly when a large number of shots are to be fired. Furthermore, when the explosive shot emanates from a point source as is the case with an explosive cartridge, the efficiency of the generated wave is low for the reason that the rate of changes of pressure and the duration of the pressure peak do not correspond to the frequency most favorable to seismic wave propagation. It has been found necessary in the use of these prior devices to employ relatively large quantities of explosives to effect deep penetration of the seismic wave within the subaqueous geological formation by reason of the undesired frequencies and inefficient character of the wave thus produced.

The above problems are, however, overcome by the gas exploder seismic prospecting device described in copending application Ser. No. 613,792, filed Feb. 3, 1967, by Lauren G. Kilmer, which is especially designed for underwater geophysical prospecting although, if desired, the device can also be used effectively for land prospecting as well. In general, the gas exploder of this application comprises a rigid top and a rigid bottom which, when at rest, are so constructed as to form between them a chamber in which a gas explosion can take place. The top and bottom are joined together by an extensible sidewall such that relative vertical separating movement can take place between them with the chamber remaining closed, to allow an increase in the volume of the chamber.

It is apparent the lack of a solid platform for the bottom of the gas exploder to rest on when the device is used underwater can present some difficulty; however, this is overcome by attaching the bottom to the top with a resilient fastening or spring means having air cushions which limit the relative vertical separating movement between the top and bottom and bias the bottom toward the top, so that the volume of the chamber is generally maintained in its original size. Internally of the gas exploder a dynamic seal is provided positioned on the inner side or inside of and adjacent the clearances at the joint between the top and bottom of the gas exploder. Also, in order that the resilient fastening or spring means which biases the top and bottom of the exploder together be not overly strained, a valving arrangement is employed to release the force of the exploded gas simultaneously as relative movement between the top and bottom of the exploder occurs. This is also desirable particularly where several explosions are required at a given location. The Kilmer device is quite useful in underwater geophysical prospecting; however, due to the forces applied in the chamber and the rate at which the top and bottom separate, that portion of the air spring cushion attached to the bottom which forms the top of the air cushion is eroded by the water against which it moves, i.e. is cavitated, since its movement draws a vapor phase on this part. Also, a part of this energy which produces the seismic wave of interest is lost to the water. This invention overcomes these difficulties by providing a bubble cap above the top of the air cushion which is filled with air. In this invention the movable upper part of the device does not work against water but against a compressible gas.

For a more complete understanding of the practical application of this invention, reference is made to the appended drawing in which:

FIGURE 1 is a vertical section of a gas exploder constructed in accordance with this invention; and FIGURE 2 is an enlarged fragmentary view taken along line 2—2 of FIGURE 1.

As illustrated in FIGURE 1, the exploder in accordance with this invention basically includes a top 110, a bottom 112, a sealing ring 113, a valve 114 and an exhaust stack 115. Top 110 includes an annular, thick-steel plate 124 having an outside diameter slightly smaller than the inside diameter of the flange 122 on bottom 112 and is further provided with a depressed portion 126 in the bottom thereof as well as a groove 128 in the side thereof which contains sealing ring 113. The depressed portion 126 of plate 124 cooperates with bottom plate 120 of bottom 112 to form the chamber A' of the exploder. Plate 124 also has an annular groove 130 in its upper surface between its outer rim and a central opening 132. Two smaller annular grooves 134 and 134' can be arranged, if desired, in plate 124 on opposite sides of groove 130 for O-rings 146 and 146', respectively, which seal groove 130. Groove 130 is connected to the chamber A' by two small, vertical openings 136 disposed at 180° relative to each other about central opening 132. Plate 124 carries a coaxially positioned, generally annular upper ring 138 which is attached to the top side of plate 124 and covers groove 130 to form therewith an annular passage.

Valve 114 includes a valve body 150, a piston (valve element) 152, a helical spring 154 and a spring retainer cage 156. Generally valve body 150 includes a pair of coaxial cylindrical walls 158 and 160, which are spaced from each other, are closed together at their lower ends by means of an interconnecting annnular and wall 162 and are open at their upper ends. The outer sidewall 158 and its upper end is provided with an outwardly extending annular flange 164 and itself has a diameter just less than that of opening 132 such that valve body 150 can be positioned in opening 132 with flange 164 overlying the top of plate 124. Inner wall 160 has a machined inside surface which is counter-sunk at its upper end and which is provided with a series of apertures 166 adjacent its lower end providing communication between the annular space between walls 158 and 160 and the central opening of valve body 150 lying inside wall 160. Piston 152 which is a machined casting sized to fit snugly but slidingly within cylindrical wall 160 has a flange 168 at its upper end received in the counter bore in the upper end of the interior of wall 160 to limit downward movement of piston 152 at a position in which the lower, closed end seals openings 166 in wall 160. An O-ring 170 cushions flange 168 at the counter bore surface. Piston rings 182 seal the piston 152 at its lower end.

Spring cage 156 is a short steel cylinder 172 which has a pair of intersecting steel cross-plates 176 in its upper interior portion forming a spider to which is secured a depending cylindrical rod element 178. The cylinder portion 172 of spring cage 156 is positioned above valve body 150 with flange 174 overlying flange 164 and spring cage 156 and valve body 150 are retained in such position by a series of cap bolts 180 received in apertures in flanges 164 and 174 which register with correspondingly disposed tapped bores arranged about opening 132 in plate 124 such that helical spring 154 is retained snugly under compression between the underside of spider 176 and the upperside of the closed bottom of piston 152. The spacing of the flights of spring 154 in this position and the length of piston 152 in relation to the location of spider 176 is such that when piston 152 is displaced upwardly to the maximum compression of spring 154, apertures 166 in sidewall 160 are completely exposed to connect the chamber A' with the annular space between walls 158 and 160 of valve body 150 and hence with the exterior of the exploder through spring cage 156 and exhaust pipe 118. Pipe 118 can be connected through muffler 115 to provide low-pass characteristics desirably having an upper cut-off frequency on the order of five cycles per second.

The gas charging system, shown in detail in FIGURE 2, basically includes a mixing valve interconnected to groove 130. The mixing valve comprises a member 190 inserted into aperture 188 in ring 138. Member 190 has a central passage 192 and a tapered conical opening 194 which faces groove 130. A top valve member 196 carries a depending tube 198 which is inserted into passage 192 and opening 194 where the spacing of the passage through opening 192 is controlled by the location of tube 198. A passage 200 extends through tube 198 and member 196. Separate valved connections 202 and 204, leading to storage cylinders (not shown) respectively for propylene, or other suitable combustible gas, and oxygen are connected, respectively, to passages 192 and 200. Two O-rings 206 and 206' seal member 190 to ring 138 and member 196, respectively. The ignition system includes two spark plugs 207 and 207' (FIGURE 2) arranged in apertures in ring 138 on either side of the mixing valve to extend through ring 138 and communicate with groove 130. Exteriorly the spark plugs thus mounted are electrically connected via lines 207a and 207b to a suitable electrical supply (not shown). It is also apparent that other types of gas manifolds, ignition systems, and valves, such as illustrated in Kilmer application S.N. 613,792 can be used, if desired.

Skirt 250 is attached to bottom plate 120 at the outer rim thereof, e.g. through the use of the bolts connecting member 210 to flange 122. In the absence of skirt 250, an explosion in chamber A' can tend to bow bottom plate 120 upward in the middle thereof. It is theorized that, due to the absence of a support beneath the same in water and the incompressibility of water, the water escapes from beneath bottom plate 120 faster at the edges than at the middle. Bowing of plate 120 can interfere with the operation of the device by closing passages 130 and/or valve 114. Air holes 252 are provided in skirt 250 to allow air to escape upon submersion of the device. It is noted the bottom edge of skirt 250 has a wavey configuration which assists in preventing cavitation of the bottom.

An air cushion, generally designated as B, formed between upwardly extending members 210 and 212 resiliently fastens bottom 112 to top 110. Member 212 is bolted to top member 124 at flange 214 and includes an upper flange 216 which engages flange 218 on muffler 115. Flange 216 is sealed at flange 218 by O-ring 220 and flange 214 is sealed at top member 124 by O-ring 222 to form between member 212 and muffler 115 an air space I. Member 210 is bolted at flange 224 to the flange 122 of bottom 112. Member 210 extends upwardly and inwardly toward member 212 to slidedly engage member 212. Member 210 engages member 212 at an enlarged portion 226 and is sealed thereat by O-rings 228 to form an air space II. Member 212 can be sheathed in a metal 256, e.g. Monel metal, for protection against sea water, if desired. Space II is normally filled with air under pressure, e.g. about 15 to 20 p.s.i.g. by means of a hose 230 which extends through the flange 216 (not shown). The air pressure in space II bleeds through bleed valve 254 at a reduced rate from space II into space I which, accordingly, serves as a plenum chamber for the air filled spring. Space I is used to house the various hose connections 202 and 204 for the gas charging system, the mixing valve, the ignition spark plugs 207 and 207', hose 230, etc. and the pressure in space I serves to keep water out.

A bubble cap arrangement is attached to flange 216 of member 212 which includes a member 240 extending outwardly of member 210. Member 240 has a downwardly extending skirt 242 which forms an air space above member 210 in which member 210 can freely move. As mentioned above, if member 210 is allowed to move freely against the water above it, cavitation of the member will occur. Also, a portion of the force of the explosion, which creates the seismic wave, dissipates into the water.

In operation the gas exploder is located at a suitable location with bottom 112 resting beneath the surface of a body of water at a desired depth, e.g. up to 50 or more feet, with pipes connecting exhaust pipe 118 to the atmosphere above the surface of the water. Typically the force of spring 154 is sufficient such that operation of piston 152 does not occur until a pressure within exploder chamber A' on the order of 30 p.s.i.g. has been reached. Conduits 202 and 204 introduce propylene and oxygen until a pressure in exploder chamber A' on the order of 2 p.s.i.g. has been achieved. (It will be apparent that a stoichiometric mixture of oxygen and propylene is sought and that this is achieved quite simply by introducing the gases such that the partial pressures of each are in proportion to the molar ratio of a stoichiometric mixture, i.e., $4.5:1::O_2:C_3H_6$) The mixing valve insures adequate mixing of the gases. The pressure in space II is adjusted by introducing air through conduit 230 to provide a pressure sufficient to hold the bottom 112 and top 110 together and return them after an explosion. Upon explosion of the gases, the initial force of the explosion is directed against bottom 112 due to the larger mass of top 110 to create the seismic wave of interest. The continued expansion of the exploding gases drives the bottom 112 downwardly relative to top 110 since bottom 112 is relatively considerably lighter than top 110 tending to compress the air spring formed by space II. At such time the pressure of the exploding gases forces sealing ring 113 tightly against the joint formed between the flange 122 and top body 124, generally deforming ring 113 against such joint. At the same time as relative movement of the bottom 112 and top 110 occurs, however, piston 152 is lifted at even faster rate to vent chamber A' through valve 114 and muffler 115. This vent action is so rapid that normally the pressure is relieved within a fraction of a second and, generally after such venting, the pressure of unvented combustion gases remaining between top 110 and bottom 112 is substantially negative to atmospheric, being on the order of five p.s.i.a. As a result, it is usually unnecessary in subsequent firing to purge the interior of the gas exploder when recharging, and recharging can be so fast that repetitive firing at significantly rapid rates is feasible. After an explosion, top 110 and bottom 112 are biased toward their closed position by the air pressure with space II as well as the forces applied by the weight of top 110 and hydrostatic pressure. The air pressure in space II also prevents bottom 112 from falling off the unit during use of the exploder underwater. Closure of valve 114 through the action of spring 154 is timed to provide for exhaust of chamber A'.

It is claimed:

1. Apparatus for propagating a seismic wave underwater including means defining a closed chamber having a rigid bottom and rigid top including at least a portion telescoping into said bottom and forming a joint between said top and bottom at their sides having clearances therebetween, a resilient sealing ring disposed between top and bottom on the inner side of said joint positioned against the clearances thereof to seal said chamber, resilient fastening means normally biasing said top and bottom together for attaching said bottom to said top and permitting vertical movement between said bottom and said top including at least one air spring cushion for limiting said movement and formed by a member riding with said top and a member riding with said bottom during said vertical movement, cap means on said top forming an air space above said air spring cushion so that the uppermost of said members moves therewithin, gas charging means including conduit means providing external communication to said chamber adapted to provide a combustible mixture in said chamber, ignition means for the combustible mixture, exhaust means including means defining an opening in said top adapted to provide external communication from the atmosphere to said chamber, normally closed valve means positioned in said opening to close said communication therethrough and operable upon a predetermined increase in pressure in said chamber to open thereby communicating said chamber with the exterior of said device, and muffler means sealingly secured to said top over said opening, said top including a flange engaging said muffler means to form therewith another air space, and bleed valve means interconnecting said air cushion and said another air space, said gas charging means and ignition means being arranged at least in part in said another air space.

2. Apparatus as defined in claim 1 wherein said gas charging means includes a mixing valve arranged in said another air space and in the conduit means providing external communication to said chamber and said ignition means includes spark plug means operatively arranged in the conduit means downstream of said mixing valve for igniting the gas mixture in said conduit means and said chamber.

3. Apparatus for propagating a seismic wave underwater including means defining a closed chamber having a rigid bottom and rigid top including at least a portion telescoping into said bottom and forming a joint between said top and bottom at their sides having clearances therebetween, a resilient sealing ring disposed between said top and bottom on the inner side of said joint positioned against the clearances thereof to seal said chamber, a first annular member secured to said bottom outwardly of the top and extending above the top, a second annular member secured to and extending above said top, said first and second members being arranged to slidingly and sealingly engage each other above said top and to form therebetween an air cushion, means for supplying air to said air cushion, a third annular member attached to said second annular member above said first annular member, said third annular member extending outwardly of said first annular member and including a skirt extending downwardly along the side of the first annular member to form thereabove an air space, said first annular member moving in said air space during vertical movement between the top and bottom, gas charging means including conduit means providing external communication to said chamber adapted to provide a combustible mixture in said chamber, ignition means for the combustible mixture, and exhaust means including means defining an opening in said top adapted to provide external communication from the atmosphere to said chamber and normally closed valve means positioned in said opening to close said communication therethrough and operable upon a predetermined increase in pressure in said chamber to open thereby communicating said chamber with the exterior of said device.

4. Apparatus as defined in claim 3 wherein the gas charging means includes a first conduit formed by a groove in the top surface of said top and plate means secure to said top above said groove, at least one second conduit connecting said first conduit to said chamber and means for supplying a mixture of fuel gas and oxygen-containing gas to said first conduit including a mixing valve attached to said plate means and means for interconnecting said mixing valve to a source of fuel gas and a source of oxygen containing gas, and wherein said ignition means includes spark plug means operatively arranged on both sides of the mixing valve to ignite the gas mixture in said first conduit.

5. Apparatus for propagating a seismic wave underwater including means defining a closed chamber having a rigid bottom and rigid top including at least a portion telescoping into said bottom and forming a joint between said top and bottom at their sides having clearances therebetween, a resilient sealing ring disposed between said top and bottom on the inner side of said joint positioned against the clearances thereof to seal said chamber, resilient fastening means normally biasing said top and bottom together for attaching said bottom to said top and permitting vertical movement between said bottom and said top including at least one air spring cushion for limting said movement and formed by a member riding with said top and a member riding with said bottom during said vertical movement, cap means on said top forming an air space above said air spring cushion so that the uppermost of said members moves therewithin, gas charging means including conduit means providing external communication to said chamber adapted to provide a combustible mixture in said chamber, ignition means for the combustible mixture, exhaust means including means defining an opening in said top adapted to provide external communication from the atmosphere to said chamber, normally closed valve means positioned in said opening to close said communication therethrough and operable upon a predetermined increase in pressure in said chamber to open thereby communicating said chamber with the exterior of said device, and a skirt attached to said bottom and extending downwardly therefrom and holes in said skirt at said bottom to release trapped air from the skirt as the apparatus is submerged.

6. Apparatus as defined in claim 5, wherein the bottom edge of the skirt has a wavy configuration.

7. Apparatus for propagating a seismic wave underwater including means defining a closed chamber having a rigid bottom and rigid top including at least a portion telescoping into said bottom and forming a joint between said top and bottom at their sides having clearance therebetween, a resilient sealing ring disposed between said top and bottom on the inner side of said joint positioned against the clearances thereof to seal said chamber, a first annular member secured to said bottom outwardly of said top and extending above said top, a second annular member secured to and extending above said top, said first and second annular members being arranged to slidingly and sealingly engage each other above said top to form therebetween an air cushion, means for supplying air under pressure to said air cushion, cap means on said top forming an air space above said air cushion, gas charging means including conduit means providing external communication to said chamber adapted to provide a combustible mixture in said chamber, ignition means for the combustible mixture, exhaust means including means defining an opening in said top adapted to provide external communication from the atmosphere to said chamber, and normally closed valve means positioned in said opening to close said communication therethrough and operable upon a predetermined increase in pressure in said chamber to open thereby communicating said chamber with the exterior of said device.

8. Apparatus as defined in claim 7 wherein said valve means is a spring biased piston valve.

References Cited

UNITED STATES PATENTS

| | | |
|---|---|---|
| 3,056,104 | 9/1962 | De Kanski et al. _____ 181.5 X |
| 3,198,282 | 8/1965 | Dunaway. |
| 3,205,971 | 9/1965 | Clynch. |
| 3,256,501 | 6/1966 | Smith. |
| 3,260,327 | 7/1966 | McCollum. |

BENJAMIN A. BORCHELT, *Primary Examiner.*

G. H. GLANZMAN, *Assistant Examiner.*